No. 635,488. Patented Oct. 24, 1899.
E. J. KNEELAND.
LINER FOR CENTRIFUGAL CREAM SEPARATORS.
(Application filed Aug. 1, 1898.)
(No Model.)
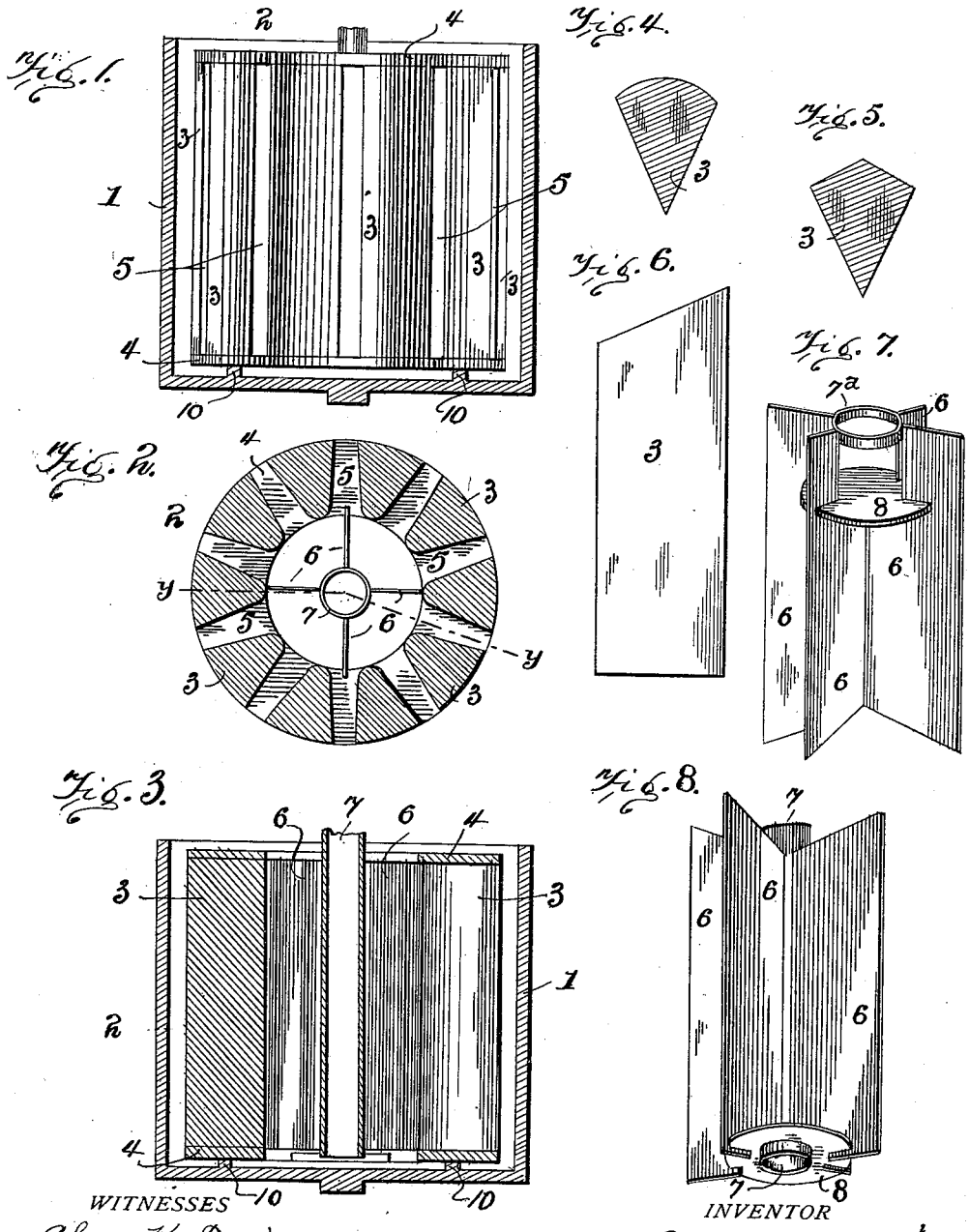
WITNESSES
Chas. K. Davies.
M. E. Brown
INVENTOR
E. J. Kneeland
By C. C. Wood
Attorney.

UNITED STATES PATENT OFFICE.

EDWIN J. KNEELAND, OF LANSING, MICHIGAN.

LINER FOR CENTRIFUGAL CREAM-SEPARATORS.

SPECIFICATION forming part of Letters Patent No. 635,488, dated October 24, 1899.

Application filed August 1, 1898. Serial No. 687,467. (No model.)

*To all whom it may concern:*

Be it known that I, EDWIN J. KNEELAND, a citizen of the United States, residing at Lansing, in the county of Ingham and State of Michigan, have invented certain Improvements in Milk-Quieting Devices for Centrifugal Separators, of which the following is a specification.

It has been found that the great obstacles in the way of successful and rapid work with machines of this kind have been, first, in the formation of circulatory currents within the mass of milk that tend to prevent the separation of the cream from the milk, and, second, in the fact that in nearly or quite all of the devices now in use the walls of the separating chambers or passages are inclined toward one another, and the cream by coming in contact with other cream particles and by striking against the walls lodges against them and not only obstructs the passage of the cream particles to the center, but clogs the passages and prevents perfect circulation, as well as causing waste of cream.

Figure 1 represents a section of a separator-bowl and an elevation of a milk quieting or steadying device of this invention in position in the bowl. Fig. 2 is a horizontal section of the gravity-piece composed of solid prismatic sectors or bars and end rings and of the core. Fig. 3 is a cross-section of the bowl and quieting-device, the section planes being indicated by dotted line $y\ y$, Fig. 2. Figs. 4 and 5 are sections of the sectors, bars, or prisms of the gravity-piece, somewhat modified. Fig. 6 is a modified elevation of one of the sectors or prisms of the gravity-piece for a bowl with conical top or bottom. Fig. 7 is a perspective of cream-steadying core such as may be used when milk is admitted at the top and drawn from the bottom of the bowl. Fig. 8 is a perspective of core which may be used for a bowl to which milk is admitted at bottom and drawn from the top. Figs. 4 to 8 are on relatively larger scale than Figs. 1, 2, and 3.

It will be understood that as the invention relates only to milk-quieting devices and not to the separator-bowl no attempt has been made to illustrate particular constructions of such bowls, it being apparent that the improvement may be applied to any such bowl to which it is adapted.

The numeral 1 indicates a separator-bowl of common construction. Other forms might be used.

2 indicates the gravity quieting or steadying device. This is preferably a metallic piece consisting of horizontal end rings 4 4, which are connected by vertical prisms or sectors 3 3, the prisms or sectors being rigid with the rings and having spaces 5 5 between them. The gravity-piece is of such diameter as to enter easily within the bowl and is loosely supported by projections 10 from the bottom of the bowl. The passages 5 between the prisms 3 are preferably wider toward the center of the bowl, and between the inner edges of the prisms 3 is the cream-pool, in which the core is inserted. This cream-pool is approximately one-half the diameter of the bowl.

The cream-steadying core is composed of vanes 6 6 and preferably has a central milk-tube 7, although, as in Fig. 7, this tube may be replaced by a ring $7^a$. A separating-plate 8 extends horizontally part way across the milk-pool. The milk is fed to the bowl through the tube 7 or in other usual manner, and the cream and blue milk are withdrawn in any manner common in this art.

The cream-steadying core is not of my invention, being well known in this art. Its use with the gravity device 2 seems to be novel. The vanes of the core extend from the tube 7 to close proximity with the prisms or sectors of the gravity-piece 2.

The gravity-piece 2, composed, as it is, of solid prisms with narrow channels between, serves to break up the liquid column in the bowl into comparatively small vertical columns, and the separation of the milk from the cream is much more readily effected. The solid sectors or prisms displace a quantity of milk or cream in the bowl equal to their cubic contents. The piece 2, having all the prisms 3, is readily attachable as one piece and can be conveniently cleaned and replaced, as can the core-piece. Preferably opposite wings of the core-piece may extend slightly into the spaces 5 between the sectors 3 to prevent separate rotation of the gravity-piece and core.

What I claim is—

1. In a centrifugal machine, the milk-quieting device consisting essentially of the two flat rings connected by solid vertical bars, there being narrow vertical spaces or passages extending radially between said sectors, substantially as described.

2. The combination with the separator-bowl having supports as 10 on the bottom, of the piece consisting of end rings one of which rests on said supports, and solid vertical bars connecting said rings, substantially as described.

3. The combination with a separator-bowl of a quieting device consisting essentially of a supporting-ring and solid bars extending vertically from the same, leaving narrow vertical passages between said bars, said passages extending radially to the bowl and separated from each other by the bars, and a separate core, having radial vanes and located in the central space between said bars, substantially as described.

4. In a separator-bowl and in combination therewith, a steadying device consisting essentially of vertical prisms with spaces between them and suitably supported in annular position within the bowl, and a separate central core having vertical vanes, arranged within the space surrounded by said prisms and projecting to the proximity thereof, substantially as described.

EDWIN J. KNEELAND.

Witnesses:
M. D. CHATTERTON,
BLANCHE B. BOOSINGER.